(12) United States Patent
Miller et al.

(10) Patent No.: US 10,923,944 B2
(45) Date of Patent: Feb. 16, 2021

(54) METHODS, SYSTEMS AND DEVICES FOR MANAGING BATTERIES OF UNINTERRUPTIBLE POWER SUPPLIES (UPSS) AND RELATED EXTERNAL BATTERY MODULES (EBMS)

(71) Applicant: Eaton Intelligent Power Limited, Dublin (IE)

(72) Inventors: David G. Miller, Clayton, NC (US); Pradeep K. Nandam, Cary, NC (US)

(73) Assignee: Eaton Intelligent Power Limited, Dublin (IE)

( * ) Notice: Subject to any disclaimer, the term of this patent is extended or adjusted under 35 U.S.C. 154(b) by 23 days.

(21) Appl. No.: 16/292,788

(22) Filed: Mar. 5, 2019

(65) Prior Publication Data
US 2019/0273391 A1    Sep. 5, 2019

Related U.S. Application Data

(60) Provisional application No. 62/638,481, filed on Mar. 5, 2018.

(51) Int. Cl.
*H02J 7/00* (2006.01)
*H02J 9/06* (2006.01)
*H02J 7/14* (2006.01)
*H02J 9/00* (2006.01)

(52) U.S. Cl.
CPC .......... *H02J 9/061* (2013.01); *H02J 7/0013* (2013.01); *H01M 2220/10* (2013.01); *H02J 7/0024* (2013.01); *H02J 7/00032* (2020.01); *H02J 7/00036* (2020.01); *H02J 7/00047* (2020.01); *H02J 7/1423* (2013.01); *H02J 9/00* (2013.01)

(58) Field of Classification Search
CPC ............................... H02J 9/061; H02J 7/0013
See application file for complete search history.

(56) References Cited

U.S. PATENT DOCUMENTS

| | | | |
|---|---|---|---|
| 10,523,049 B2 * | 12/2019 | Toyoda .................. | H02J 9/062 |
| 2005/0168073 A1 * | 8/2005 | Hjort ...................... | H02J 9/062 307/65 |
| 2006/0290205 A1 * | 12/2006 | Heber ..................... | H02J 9/062 307/65 |

(Continued)

*Primary Examiner* — Daniel J Cavallari
*Assistant Examiner* — Kalu Kelly Emeaba
(74) *Attorney, Agent, or Firm* — Stanek Lemon Crouse & Meeks PA

(57) ABSTRACT

Systems for providing power are provided including an uninterruptible power supply (UPS) coupled to a first power source, the UPS including at least one battery therein; and at least one external battery module (EBM) coupled to the UPS and a second power source, the second power source being different and separate from the first power source. Each of the at least one EBMs include a communication circuit configured to communicate with the UPS and/or other EBMs; at least one battery string; and a battery charger coupled to the at least one battery string and the at least one battery in the UPS, the battery charger being configured to charge the at least one battery string and the at least one battery in the UPS responsive to a communication from the EBM through the smart card when power from the second power source is removed. Related EBMs and UPSs are also provided.

17 Claims, 6 Drawing Sheets

(56) References Cited

U.S. PATENT DOCUMENTS

| | | | |
|---|---|---|---|
| 2008/0211308 A1* | 9/2008 | Lin | H02J 9/062 |
| | | | 307/65 |
| 2013/0093384 A1* | 4/2013 | Nyu | G01R 31/382 |
| | | | 320/107 |
| 2013/0181528 A1* | 7/2013 | Colombi | H02J 9/062 |
| | | | 307/65 |
| 2015/0008745 A1* | 1/2015 | Navarro | H02J 9/061 |
| | | | 307/64 |
| 2015/0035359 A1* | 2/2015 | Chung | H02J 3/00 |
| | | | 307/23 |
| 2016/0006299 A1* | 1/2016 | Myhre | H02J 7/0068 |
| | | | 307/66 |
| 2016/0241081 A1* | 8/2016 | Nandam | H02J 7/0077 |
| 2016/0294210 A1* | 10/2016 | Nguyen | H02J 9/06 |
| 2018/0013317 A1* | 1/2018 | Hayes | H02J 9/061 |

* cited by examiner

METHODS, SYSTEMS AND DEVICES FOR MANAGING BATTERIES OF UNINTERRUPTIBLE POWER SUPPLIES (UPSS) AND RELATED EXTERNAL BATTERY MODULES (EBMS)

CLAIM OF PRIORITY

The present application claims priority to U.S. Provisional Application No. 62/638,481, filed on Mar. 5, 2018, entitled Methods, Systems and Devices for Managing Batteries of Uninterruptible Power Supplies (UPSs) and Related External battery Modules (EBMs), the content of which is hereby incorporated herein by reference as if set forth in its entirety.

FIELD

The inventive concept relates generally to uninterruptible power supplies (UPSs) and, more particularly, to external battery modules for use with UPSs.

BACKGROUND

Uninterruptible power supply (UPS) systems are commonly used in installations such as data centers, medical centers and industrial facilities. UPS systems may be used in such installations to provide backup power to maintain operation of computer, medical devices and other critical equipment in event of failure of a primary utility supply. These UPS systems commonly have an "on-line" configuration including a rectifier and inverter coupled by a DC link that is also coupled to a backup power source, such as a battery. Other UPS configurations may also be used, such as standby and line-interactive configurations.

External battery modules (EBMs) may be used to extend the run-time (back-up time) of UPSs. Some EBMs may also be smart and provide monitoring circuits to all the battery packs.

SUMMARY

Some of embodiments of the present inventive concept provide systems for providing power including an uninterruptible power supply (UPS) coupled to a first power source, the UPS including at least one battery therein; and at least one external battery module (EBM) coupled to the UPS and a second power source, the second power source being different and separate from the first power source. Each of the at least one EBMs include a communication circuit configured to communicate with the UPS and/or other EBMs; at least one battery string; and a battery charger coupled to the at least one battery string and the at least one battery in the UPS, the battery charger being configured to charge the at least one battery string and the at least one battery in the UPS responsive to a communication from the UPS through the smart card when power from the second power source is removed.

In further embodiments, the communication circuit may be further configured to communicate loss of power from the second power source to the UPS and/or the other EBMs.

In still further embodiments, each of the at least one EBMs may include a plurality of battery strings and each of the plurality of battery strings may include a plurality of batteries.

In some embodiments, the at least one battery string in the EBM and the at least one battery in the UPS may be connected in parallel such that when power from the second power source is lost, batteries in the at least one battery string and batteries in the UPS all begin to discharge. The presence of the battery charger may allow the at least one battery string and the batteries in the UPS to remain charged until power from the second power source is restored In further embodiments, the battery charger is configured to charge all batteries in the at least one battery string and batteries in the UPS until power from the second power source is restored.

In still further embodiments, the communication circuit may be further configured to inform the UPS when power from the second power source is restored and the UPS may return to rest mode after a predetermined period of time responsive to the communication that the power from the second power source has been restored.

In some embodiments, the first and second power sources may be alternating current (AC) power sources.

Further embodiments of the present inventive concept provide external battery modules (EBMs) for providing power including a communication circuit configured to communicate with the Uninterruptible Power Supply (UPS) and/or other EBMs; at least one battery string; and a battery charger coupled to the at least one battery string and the at least one battery in the UPS connected to a first power source, the EBM being connected to a second power source, the second power source being different and separate from the first power source. The battery charger is configured to charge the at least one battery string and the at least one battery in the UPS responsive to a communication from the UPS through the communications circuit when power from the second power source is removed.

Still further embodiments provide uninterruptible power supplies (UPSs) including at least one battery therein, the UPS being coupled to a first power source and at least one external battery module (EBM), the at least one EBM being coupled to a second power source, the second power source being different and separate from the first power source. Each of the at least one EBMs includes a communication circuit configured to communicate with the UPS and/or other EBMs; at least one battery string; and a battery charger coupled to the at least one battery string and the at least one battery in the UPS. The battery charger is configured to charge the at least one battery string and the at least one battery in the UPS responsive to a communication from the UPS through the communications circuit when power from the second power source is removed.

DETAILED DESCRIPTION

Figure 1:
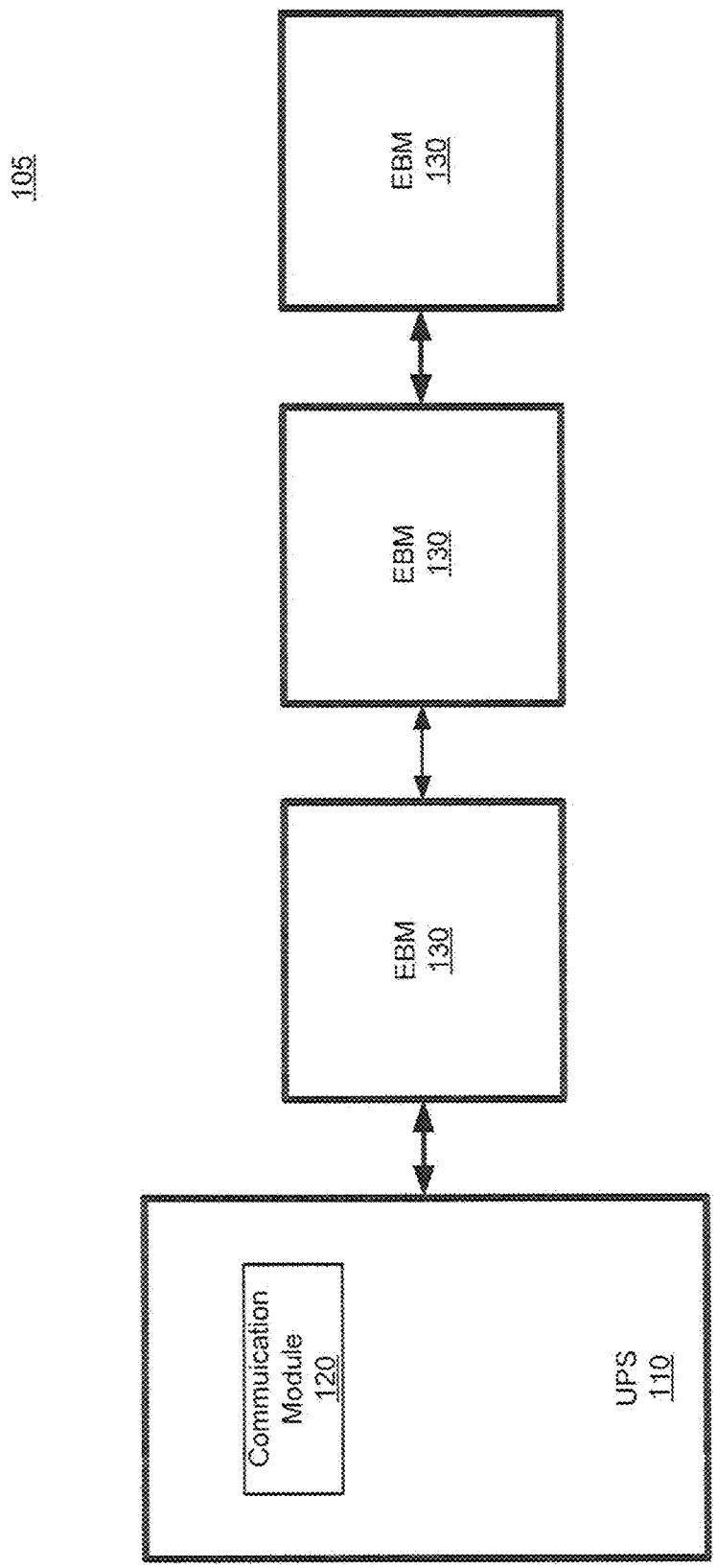
FIG. 1 is a block diagram of a system including an uninterruptible power supply (UPS) and a plurality of external battery modules (EBMs).

Specific example embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, with a limited number of batteries, an uninterruptable power supply (UPS) can only provide a certain amount of backup power (additional run-time) depending on the size of the load connected to the UPS and the battery power available. To extend this run-time or backup time, customers use external batteries or external battery modules (EBMs). These EBMs can be one of two types, "Dumb EBMs" and "Smart EBMs." Dumb EBMs are simply a cabinet with batteries and generally cannot communicate with the UPS. Smart EBMs, on the other hand, can communicate with UPSs and can add significant value to the overall system design by being able to identify bad battery strings and the like. When power to a Smart EBM is lost, the batteries of the EBM will be used to power a communication server board (CSB) in the Smart EBM so communication between the EBM and the UPS/other EBMs can continue when power is removed from the EBM. Although this is a positive feature, an unintended consequence of using the batteries in the EBM to power the CSB is a slow draining of the batteries not only in the EBM but also in the UPS, especially if the UPS's charger is in Rest Mode. Rest mode is one of the states of a battery charger in Advanced Battery Management (ABM) that is intended to extend the life of the batteries. This may negatively affect the life of batteries in the EBMs and the connected UPS, and may also initiate unnecessary alarms.

Accordingly, embodiments of the present inventive concept provide methods, systems and devices that use the communication channel between the smart EBMs and the UPS to communicate about the states of the AC Input for the EBM to reduce battery discharge and extend life of batteries in the system. For example, in accordance with embodiments discussed herein, when an AC Input to a smart EBM fails, but the AC Input to the UPS is still functional, the CSB in the EBM informs the UPS that the AC Input for the EBM has failed, and that the batteries for the EBM are being used to power the CSB. This indicates to the UPS that the batteries in the EBM are getting discharged. Since the UPS' batteries are connected in parallel with the EBM's batteries, they will also be discharged to power the CSB of the EBM. Thus, responsive to the indication from the EBM that the AC Input has failed, some embodiments of the present inventive concept turn on the battery charger. The charge current needed to charge the battery is relatively small as the CSBs only draw a small amount of power. Turning the battery charger on will keep the batteries from getting drained and, therefore, avoid a negative impact on the life of the batteries as will be discussed further below with respect to FIGS. 1 through 4.

Referring now to FIG. 1, a basic block diagram of a system including multiple EBMs will be discussed. As illustrated in FIG. 1, the system 105 includes a UPS 110 and a plurality of EBMs 130 daisy chained together. As used herein, "daisy-chain" refers to connecting two or more devices together in a linear series. It will be understood that the configuration of FIG. 1 is provided for example purposes only and that embodiments of the present inventive concept are not limited the configuration thereof. For example, although three EBMs 130 are illustrated in FIG. 1, embodiments of the present inventive concept could include more or less than three EBMs without departing from the scope of the present inventive concept. In particular, in some embodiments, a super charger may be provided, which may reduce the number of EBMs needed to provide the same amount of back-up time as discussed in commonly assigned provisional application No. 62/615,539, the content of which is incorporated herein by reference.

To extend run-time (back-up time), UPSs 110 use EBMs 130. Conventional EBMs were typically "dumb," i.e. a chassis with a set number of battery strings (battery packs) without any intelligence. However, embodiments of the present inventive concept use smart EBMs 130.

Figure 2:
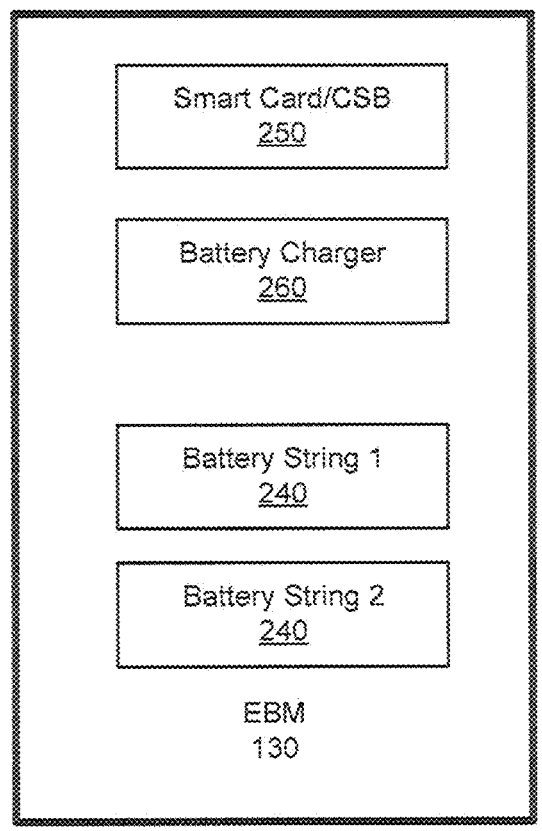
FIG. 2 is a more detailed block diagram of an example EBM.

Referring now to FIG. 2, EBMs 130 in accordance with some embodiments of the present inventive concept will be discussed. As illustrated in FIG. 2, the EBM 130 may include a plurality of battery strings, for example, battery strings 1 and 2 (240). In some embodiments, each of the battery strings 1 and 2 (240) may include two modules, each module including 5 batteries, thus, each EBM in FIG. 2 would have 20 batteries total. However, embodiments of the present inventive concept are not limited to this configuration. For example, some embodiments may include 12 battery strings including 24 total modules and a total of 120 batteries. As further illustrated in FIG. 2, EBMs in accordance with embodiments of the present inventive concept include a smart card 250 and a battery charger 260. The smart card 250 and the battery charger may be positioned in corresponding slots in the EBM 130. In some embodiments, as discussed above, the battery charger 260 may be a super charger in accordance with embodiments discussed herein.

More detailed embodiments of systems including UPSs, EBMs and battery chargers that may be used in accordance with embodiments of the present inventive concept are discussed in commonly assigned U.S. Pat. No. 9,748,799, which has been incorporated by reference above. As discussed above, the system of FIG. 1 includes a UPS with more than one EBM. The additional EBMs add additional run-time when the UPS is on battery power.

Figure 3:
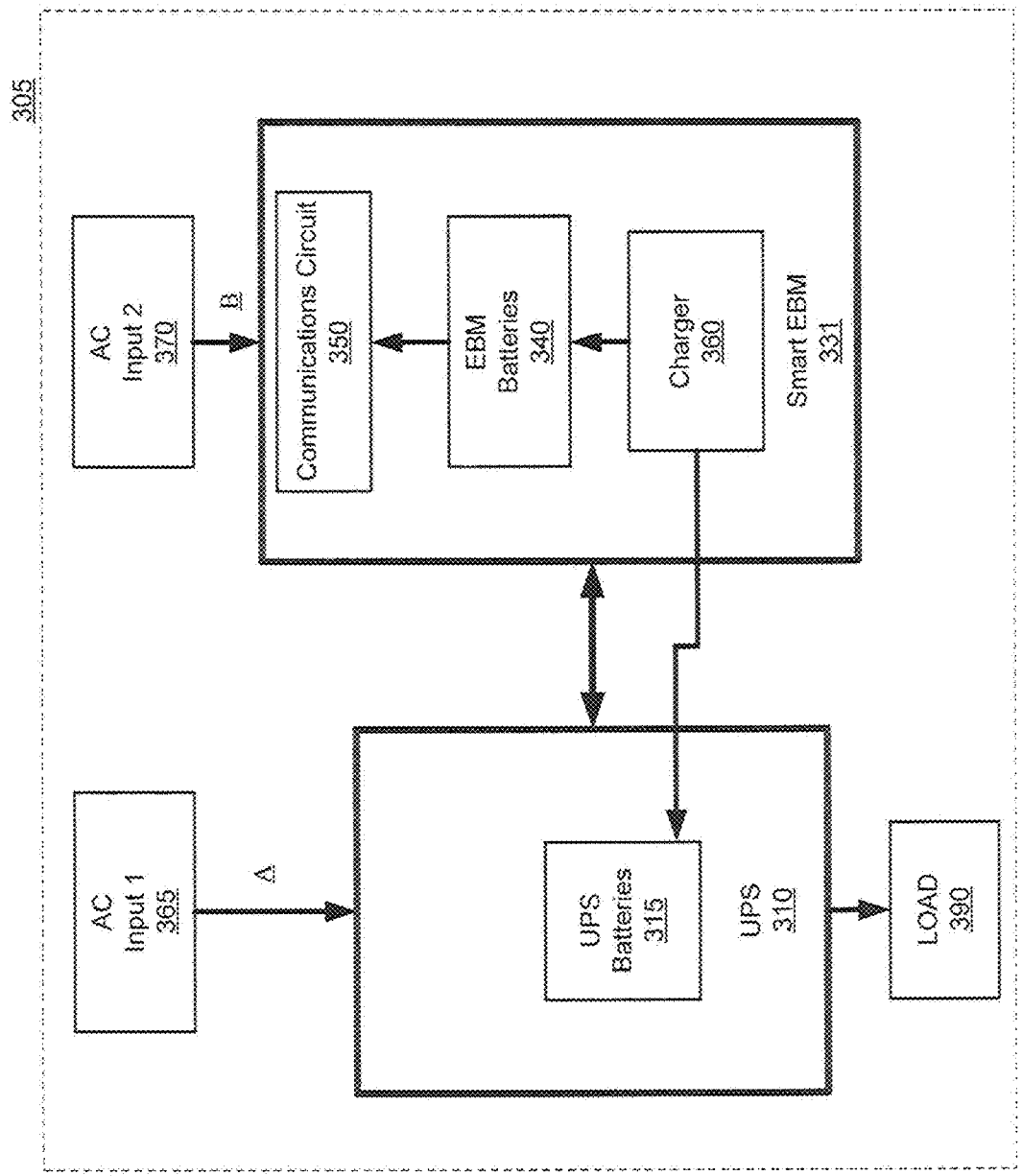
FIG. 3 is a block diagram of the system including a UPS and an EBM in accordance with some embodiments of the present inventive concept.

Referring now to FIG. 3, a system including a smart EBM with a battery charger in accordance with embodiments discussed herein will be discussed. As illustrated therein, the system 305 includes a UPS 310 coupled to a load 390 and a smart EBM 331 and first and second AC inputs 360 and 370, respectively. As illustrated in FIG. 3, only a single smart EBM 331 is included in the system 305 in contrast to the system of FIG. 1. It will be understood that more than one smart EBM may be included without departing from the scope of the present inventive concept.

Referring again to FIG. 3, the UPS 310 may include one or more batteries 315 and may be coupled to a first of the AC inputs 365. The smart EBM 331 may include a communication circuit 350 (CSB/smart card), one or more battery strings 340 and a battery charger 360 in accordance with embodiments discussed herein. A battery charger may also be included in the UPS 310 without departing from the scope of the present inventive concept. The battery charger 360 may be a conventional battery charger or a super charger without departing from the scope of the present inventive concept. The EBM 370 is coupled to a second of the AC inputs 370, which is separate and distinct from the first AC input 365.

Super chargers are discussed, for example, in commonly assigned U.S. patent Ser. No. 16/242,236, filed Jan. 8, 2019, entitled Methods, Systems and Devices for Extending Run-Times of Uninterruptible Power Supplies (USPs), the contents of which are hereby incorporated herein by reference as if set out in their entirety. When power is lost from the one AC source, it is assumed that power is not lost from the other AC source.

Thus, if and when power (B) from the second AC Input 370 to the smart EBM 331 fails, but power (A) from the first AC Input 365 to the UPS 310 is still operable, the CSB 350 in the EBM 331 informs the UPS 310 that the second AC Input 370 has failed and that the EBM batteries 340 are being used to power the CSB 350. Accordingly, the EBM 331 informs the UPS 310 that EBM batteries 340 are getting discharged. Furthermore, since the UPS' batteries 315 are connected in parallel with the EBM's batteries 340, the UPS batteries 315 are also being discharged to power the CSBs 350 of the EBM 331. It will be understood that four or more smart EBMs can be connected to the UPS 310; therefore, the discharge current may be enough to drain the batteries and reduce the life thereof. This is especially true when the battery chargers are in 'Rest Mode' where they turn off the charge current for an extended period of time after fully charging the batteries. During this rest time, if the leakage or drainage current on the batteries is high enough, it can result in false 'Battery Service Required' alarms causing service calls and avoidable expenses for the customer. If the customer doesn't take action in a timely manner, this slow drainage of batteries will likely reduce the life of the batteries.

It will be understood that second AC input (370) that powers the EBM should not be an output to the UPS 310. In other words, the customer should not derive the AC input to the EBM from one of the outputs of the UPS. Accordingly, the second AC input 370 should be a completely different AC source that is not derived from the UPS.

Once the UPS 310 receives communication from the smart EBM 331 that the second AC input 370 has failed, the UPS 310 responds by turning on the battery charger 360. The charge current needed is small as the CSBs only draw a small amount of power and turning the charger 360 on will keep the batteries from getting drained. As soon as power (B) from the second AC Input 370 is restored, the smart EBM 331 informs the UPS 310, and the UPS 310 may return to Rest Mode after a predetermined charge time to ensure good battery life as per ABM (Advanced Battery Management). Thus, the battery charger is no longer necessary and may be switched off.

As is understood by those having skill in the art, UPSs 310 provide backup power to a load 390 when primary power (AC input 1 365) is lost. The amount of backup power is extended by the presence of one or more EBMs 33. Generally, a UPS has a five or ten minute internal battery 315 and each EBM 331 can extend the battery backup (run-time of UPS) from a half hour to an hour.

In embodiments of the present inventive concept where multiple EBMs are connected to the UPS and each EBM has a separate AC input, any one of the AC inputs being lost to any EBM will invoke embodiments of the present inventive concept. Furthermore, systems in accordance with embodiments of the present inventive concept may include both smart and dumb EBMs without departing from the scope of the present inventive concept.

Figure 4:
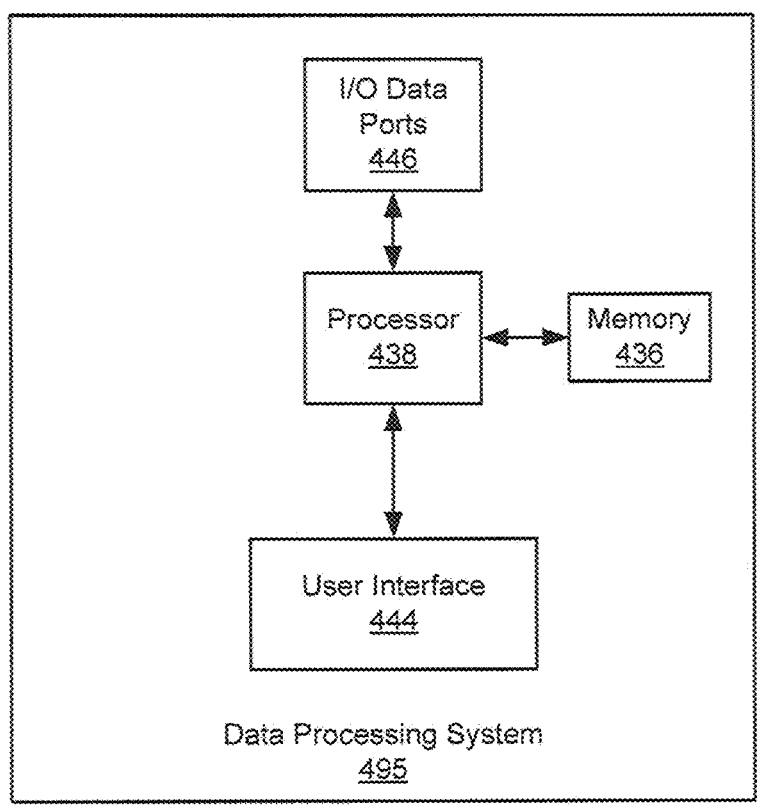
FIG. 4 is a block diagram illustrating a data processor that can be used in accordance with various embodiments of the present inventive concept.

Referring now to FIG. 4, a block diagram of a data processing system 495 that may be included in one of more of the UPSs or associated communication modules in accordance with some embodiments will be discussed. As illustrated in FIG. 4, the data processing system 495 may include a user interface 444, including, for example, input device(s) such as a man machine interface (MMI) including, but not limited to a keyboard or keypad and a touch screen; a display, a speaker and/or microphone; and a memory 436 that communicate with a processor 438. The data processing system 495 may further include I/O data port(s) 446 that also communicates with the processor 438. The I/O data ports 446 can be used to transfer information between the data processing system 495 and another computer system or a network, such as an Internet server, using, for example, an Internet Protocol (IP) connection. These components may be conventional components such as those used in many conventional data processing systems, which may be configured to operate as described herein.

Figure 5:
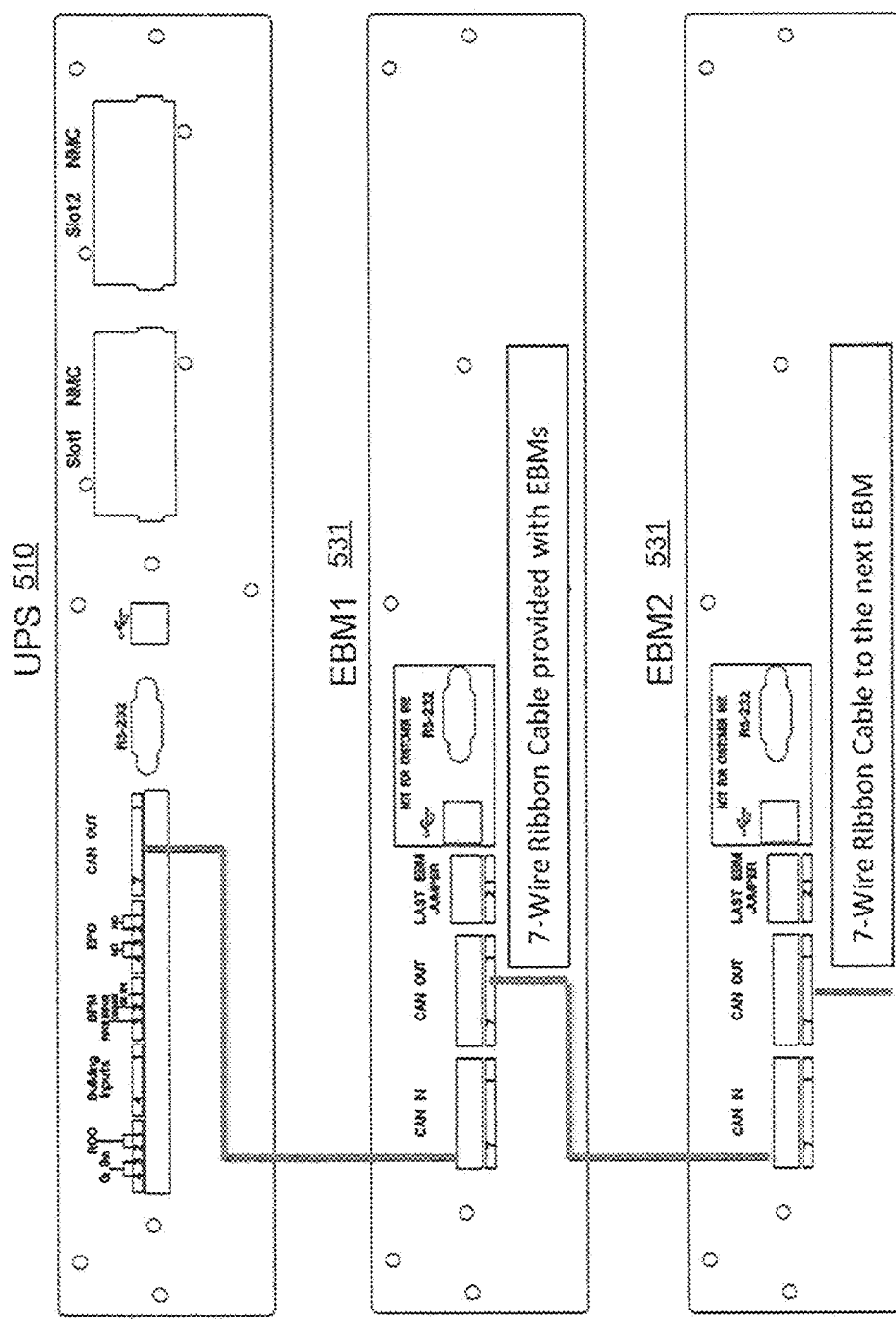
FIG. 5 is a diagram illustrating an example of a UPS coupled to multiple EBMs using Controller Area Network (CAN) bus input and output in accordance with some embodiments of the present inventive concept.
Figure 6:
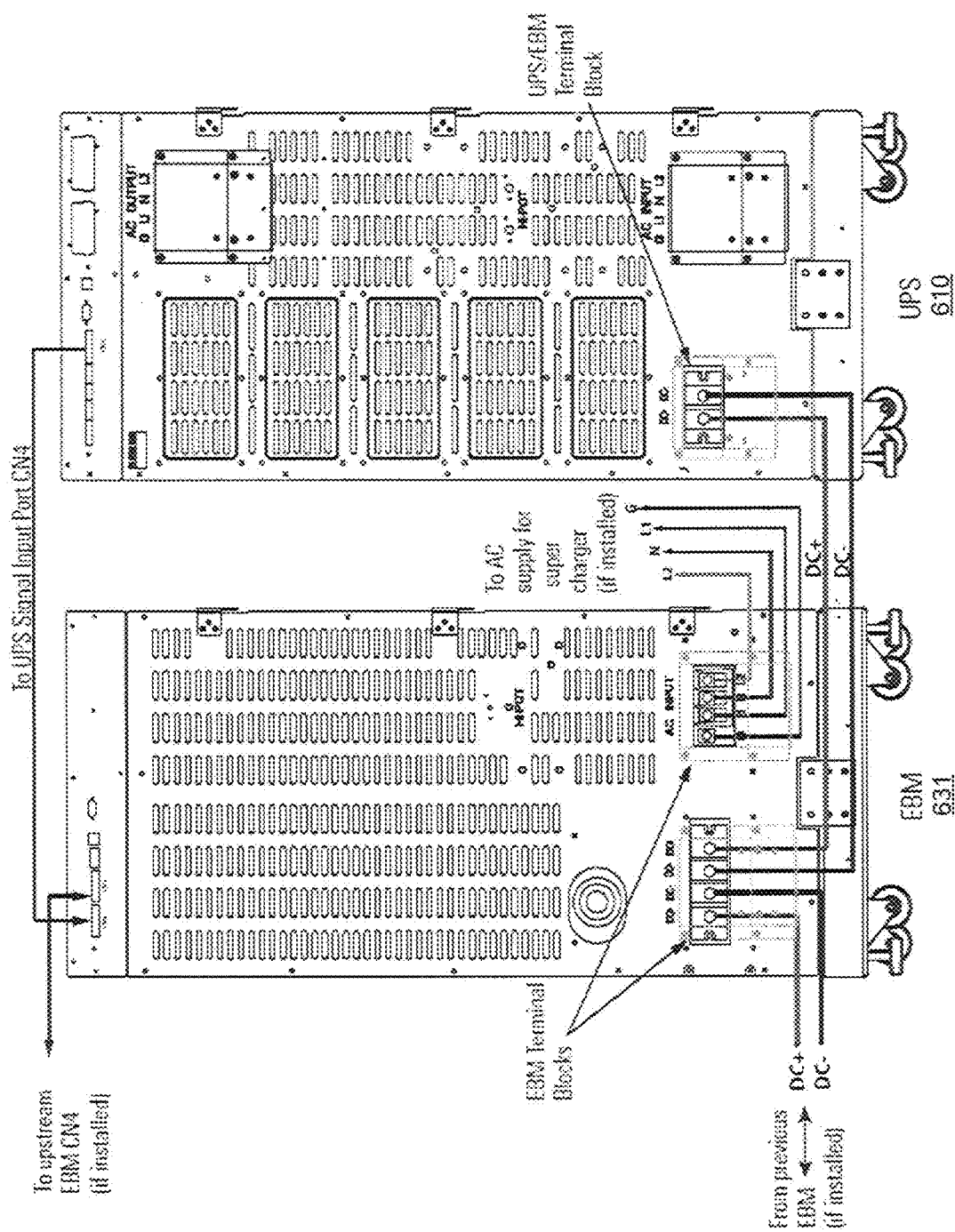
FIG. 6 is a diagram illustrating the physical connections between a UPS and EBM in accordance with some embodiments of the present inventive concept.

FIG. 5 is a diagram illustrating an example of a UPS 510 coupled to multiple EBMs 531 using Controller Area Network (CAN) bus input and output in accordance with some embodiments of the present inventive concept. FIG. 6 is a diagram illustrating the physical connections between a UPS 610 and EBM 631 in accordance with some embodiments of the present inventive concept.

As discussed above, some embodiments of the present inventive concept provide automatic battery charger control and ABM of smart EBMs during power outages. ABM generally extends battery life in UPSs. However, connecting smart EBMs that can communicate with the UPS creates a unique problem of battery drainage and false alarms in the event that the AC input for the EBM fails. Some embodiments of the present inventive concept extend the life of batteries in the EBM and the connected UPS, and, more importantly, possibly avoid unnecessary battery service required alarms that will necessitate service calls and avoidable expenses.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A system for providing power, the system comprising:
an uninterruptible power supply (UPS) coupled to a first power source, the UPS including at least one battery therein; and
at least one external battery module (EBM) coupled to the UPS and a second power source, the second power source being different and separate from the first power source,
wherein each of the at least one EBMs comprises:
a communication circuit configured to communicate with the UPS and/or other EBMs;
at least one battery string; and
a battery charger coupled to the at least one battery string and the at least one battery in the UPS,
wherein the communication circuit is configured transmit a communication from the at least one EBM to the UPS when power from the second power source is removed;
wherein the UPS is configured to turn the battery charger on responsive to the communication indicating that power from the second power source has been removed; and
wherein the battery charger is configured to charge the at least one battery string of the at least one EBM and the at least one battery in the UPS until power is restored to the second power source.

2. The system of claim 1, wherein each of the at least one EBMs comprises a plurality of battery strings and each of the plurality of battery strings comprise a plurality of batteries.

3. The system of claim 1:
wherein the at least one battery string in the EBM and the at least one battery in the UPS are connected in parallel such that when power from the second power source is removed, batteries in the at least one battery string and batteries in the UPS all begin to discharge; and wherein presence of the battery charger allows the at least one battery string and the batteries in the UPS to remain charged until power from the second power source is restored.

4. The system of claim 3, wherein the battery charger is configured to charge all batteries in the at least one battery string and batteries in the UPS until power from the second power source is restored.

5. The system of claim 1, wherein the communication circuit is further configured to inform the UPS when power from the second power source is restored and wherein the UPS returns to rest mode after a predetermined period of time responsive to the communication that the power from the second power source has been restored.

6. The system of claim 1, wherein the first and second power sources are alternating current (AC) power sources.

7. An external battery module (EBM) for providing power, the EBM comprising:
  a communication circuit configured to communicate with an Uninterruptible Power Supply (UPS) and/or other EBMs;
  at least one battery string; and
  a battery charger coupled to the at least one battery string and the at least one battery in the UPS connected to a first power source, the EBM being connected to a second power source, the second power source being different and separate from the first power source,
  wherein the communication circuit is configured transmit a communication from the at least one EBM to the UPS when power from the second power source is removed; and
  wherein the battery charger receives a command from the UPS to turn on responsive to the communication indicating that power from the second power source had been removed and configured to charge the at least one battery string of the at least one EBM and the at least one battery in the UPS until power is restored to the second power.

8. The EBM of claim 7, wherein the EBM comprises a plurality of battery strings and each of the plurality of battery strings comprise a plurality of batteries.

9. The EBM of claim 7:
  wherein the at least one battery string in the EBM and the at least one battery in the UPS are connected in parallel such that when power from the second power source is lost, batteries in the at least one battery string and batteries in the UPS all begin to discharge; and
  wherein presence of the battery charger allows the at least one battery string and the batteries in the UPS to remain charged until power from the second power source is restored.

10. The EBM of claim 9, wherein the battery charger is configured to charge all batteries in the at least one battery string and batteries in the UPS until power from the second power source is restored.

11. The EBM of claim 7, wherein the communication circuit is further configured to inform the UPS when power from the second power source is restored and wherein the UPS returns to rest mode after a predetermined period of time responsive to the communication that the power from the second power source has been restored.

12. The EBM of claim 7, wherein the first and second power sources are alternating current (AC) power sources.

13. An uninterruptible power supply (UPS) comprising:
  at least one battery therein, the UPS being coupled to a first power source and at least one external battery module (EBM), the at least one EBM being coupled to a second power source, the second power source being different and separate from the first power source,
  wherein each of the at least one EBMs comprises:
    a communication circuit configured to communicate with the UPS and/or other EBMs;
    at least one battery string; and
    a battery charger coupled to the at least one battery string and the at least one battery in the UPS,
  wherein the UPS is configured to receive a communication from the at least one EBM when power from the second power source is removed and to turn the battery charger on responsive to the communication indicating that power from the second power source has been removed; and
  wherein the battery charger is configured to charge the at least one battery string of the at least one EBM and the at least one battery in the UPS until power is restored to the second power.

14. The UPS of claim 13, wherein each of the at least one EBMs comprises a plurality of battery strings and each of the plurality of battery strings comprise a plurality of batteries.

15. The UPS of claim 13:
  wherein the at least one battery string in the EBM and the at least one battery in the UPS are connected in parallel such that when power from the second power source is lost, batteries in the at least one battery string and batteries in the UPS all begin to discharge; and
  wherein presence of the battery charger allows the at least one battery string and the batteries in the UPS to remain charged until power from the second power source is restored.

16. The UPS of claim 15, wherein the battery charger is configured to charge all batteries in the at least one battery string and batteries in the UPS until power from the second power source is restored.

17. The UPS of claim 13, wherein the communication circuit is further configured to inform the UPS when power from the second power source is restored and wherein the UPS returns to rest mode after a predetermined period of time responsive to the communication that the power from the second power source has been restored.

* * * * *